Figure 8:
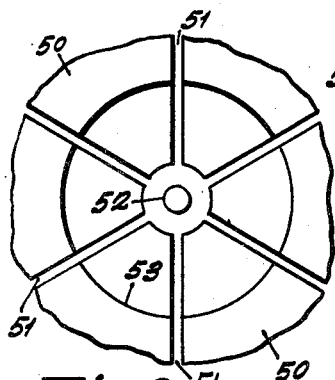

July 10, 1951  B. B. BROWN  2,560,409
ELECTRON DISCHARGE DEVICE OF THE MAGNETRON TYPE
Original Filed March 29, 1944  2 Sheets-Sheet 1
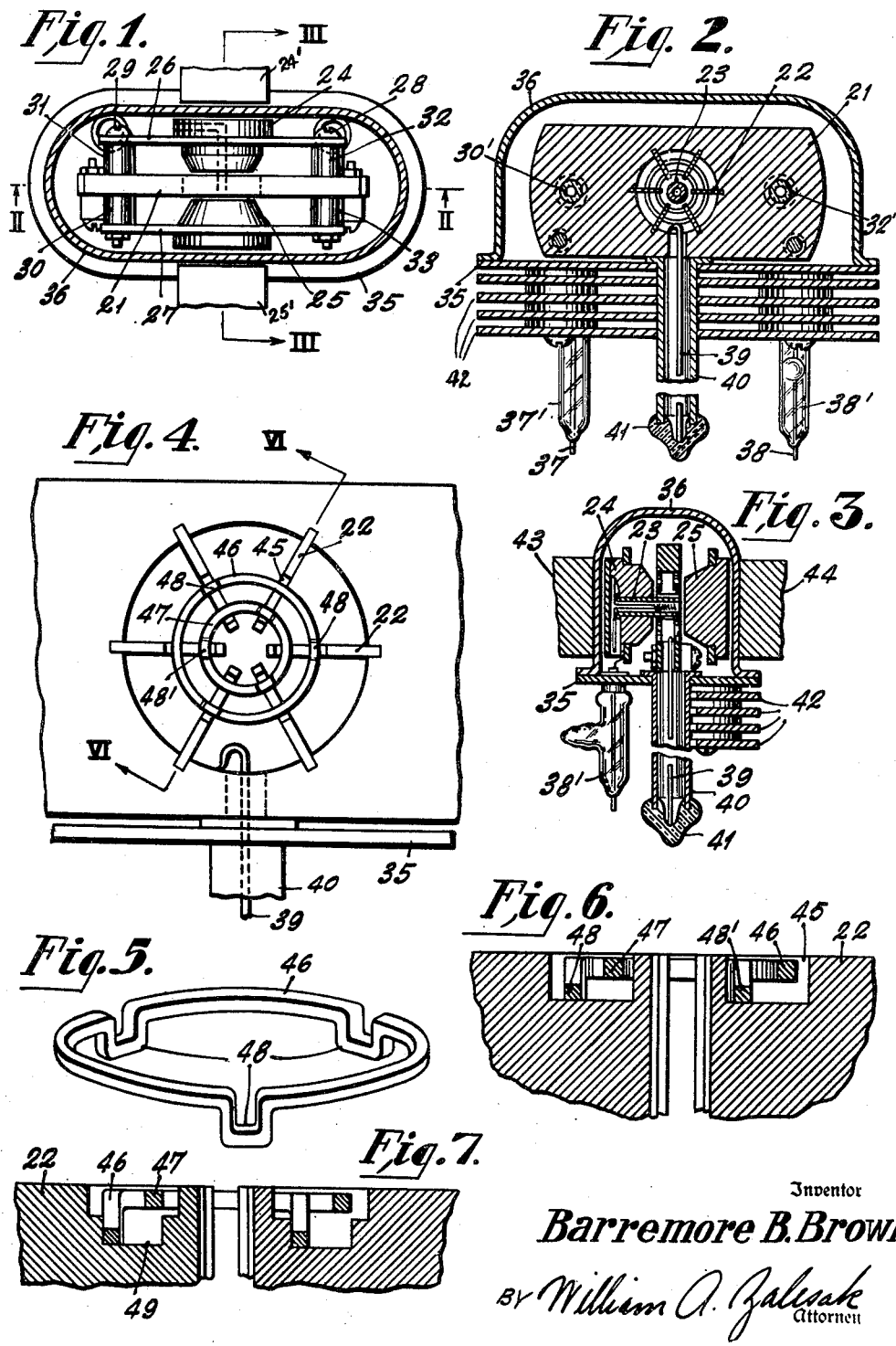
Inventor
*Barremore B. Brown*
By *William A. Zalesak*
Attorney July 10, 1951  B. B. BROWN  2,560,409
ELECTRON DISCHARGE DEVICE OF THE MAGNETRON TYPE
Original Filed March 29, 1944  2 Sheets-Sheet 2

Inventor
Barremore B. Brown
BY William A. Zalesky
Attorney

Patented July 10, 1951

2,560,409

UNITED STATES PATENT OFFICE 2,560,409

ELECTRON DISCHARGE DEVICE OF THE MAGNETRON TYPE

Barremore B. Brown, Morristown, N. J., assignor to Radio Corporation of America, a corporation of Delaware Application November 10, 1947, Serial No. 785,062, which is a division of application Serial No. 528,538, March 29, 1944, now Patent No. 2,443,445, dated June 15, 1948. Divided and this application May 16, 1951, Serial No. 226,670

3 Claims. (Cl. 315—40)

The present invention relates to electron discharge devices useful at ultra high frequencies, more particularly to devices of the magnetron type employing cavity resonators.

This application is a division of application Serial No. 785,062, filed November 10, 1947, in the names of John S. Donal, Jr., Barremore B. Brown and Carmen Louis Cuccia, as a division of application Serial No. 528,538, filed March 29, 1944, now Patent No. 2,443,445, dated June 15, 1948, assigned to the same assignee as the present application. The claims of this application are directed to the subject matter illustrated in Figs. 19 and 20 of the drawing.

Magnetrons utilized at ultra high frequencies and employing cavity resonators may be of several types. Those formed from a solid anode block have slots extending radially from the central cathode chamber and forming anode segments, the slots providing the cavity resonators between adjacent anode segments. The slots may be enlarged at their inner ends to provide resonators having a circular transverse section. In another type a plurality of slats or fins are supported within a central space and extend radially inwardly toward and define a cathode space, the inner edges of the slats serving as the anode segments and the slats and their supporting base providing cavity resonators between the anode resonators.

In magnetrons of this type, that is multi-segment type utilizing resonators, it is desirable to have the magnetron operate in only one mode, several modes being possible. In order to do this, alternate segments are connected or strapped together by means of conductors to insure operation in the desired mode. Magnetrons utilized at very high frequencies are of small size and it is difficult to strap the anode segments together. Thus, accurate and reproducible results in strapping are difficult to accomplish, causing variations in dimensions in the spacing which not only affects the wavelength at which the magnetrons operate, but also the efficiency of operation.

It is an object of the invention to provide magnetrons having improved methods of strapping, promoting ease of construction, accuracy and reproducibility as to dimensions and spacings, thus insuring that magnetrons of the same size will operate at the same frequencies and at high efficiencies.

Figure 14:
Figure 15:
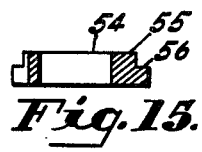
Figure 16:
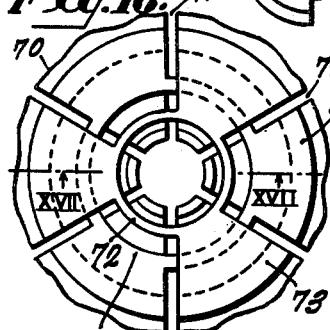
Figure 17:
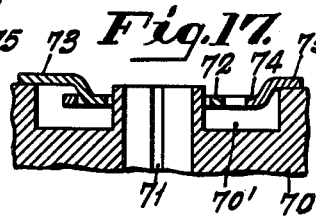
Figure 18:
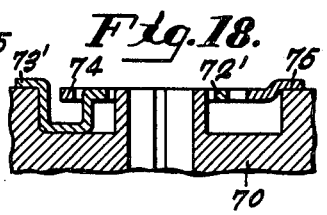
Figure 19:
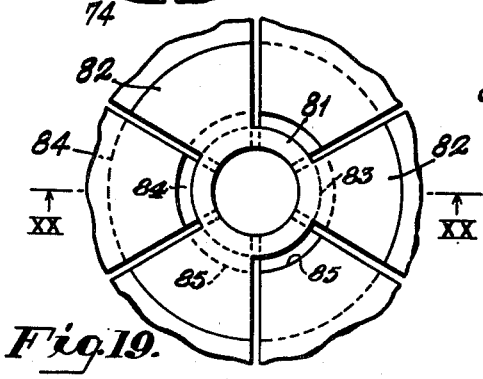
Figure 20:
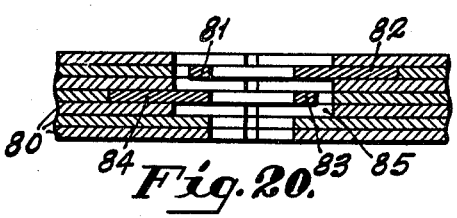

The novel features which are believed to be characteristic of the invention are set forth with particularity in the appended claims, but the invention itself will best be understood by reference to the following description taken in connection with the accompanying drawing in which Figure 1 is a top view with parts removed to show details of construction of one form of electron discharge device. Fig. 2 is a longitudinal section taken along the line II—II of Figure 1, Figure 3 is a longitudinal section taken along the line III—III of Figure 1, Figure 4 is an enlarged view of the anode segments and showing details of the strapping members employed in the device shown in Figures 1, 2 and 3, Figure 5 is a perspective showing details of construction of a strapping member, Figure 6 is a section taken along the line VI—VI of Figure 4, Figure 7 is a sectional view of a modification of the construction shown in Figure 6, Figures 8 to 13, inclusive, illustrate the steps in the construction of another form of strapping arrangement, Figures 14 and 15 show details of construction of an element utilized in Figures 8 to 13, inclusive, Figure 16 is a partial top view of still another strapping arrangement, Figure 17 is a section taken along the line XVII—XVII of Figure 16, Figure 18 is a partial section showing a modification of the construction shown in Figure 17, Figure 19 is a partial top view of a strapping arrangement made according to the present invention, and Figure 20 is a section taken along the line XX—XX of Figure 19.

Figure 1 shows an electron discharge device of the magnetron type which comprises an anode block 21 supporting a plurality of radially directed slats or fins 22 which extend inwardly from said block the inner ends of the slats providing the anode segments and defining a central cathode space in which a cathode 23 is axially positioned, this cathode being supported by a magnetic insert member 24 having oppositely disposed thereto a second magnetic insert member 25 which forms part of the magnetic circuit completed by a magnet having poles 24' and 25' The cathode and inserts are supported by means of conducting bridging members 26 and 27 which are in turn insulatingly supported from the anode block by means of bolts 28 and 29 insulated by means of insulating tubular members 30, 31, 32 and 33, these bolts also being insulated from the block by means of inserts 30' and 32'.

This electrode assembly is mounted on header member 35 to which is sealed an envelope 36, the header and envelope being made of non-magnetic material, for example, stainless steel. The cathode and heater leads 37 and 38 extend through the header and are sealed therein by means of elongated insulating cup-shaped members 37' and 38'. One of the cavity resonators formed between the slats 22 has coupled thereto a coupling member 39 which forms the inner conductor of a coaxial line, the outer tubular conductor 40 of which has hermetically sealed thereto a member 41, the inner member 39 also serving as a radiator which can be coupled into a waveguide. Cooling fins 42 may be secured to the header.

As shown in Figures 4 and 6, each of the radially directed slats or anode elements 22 is provided with a slot or recess 45 for receiving a strapping ring shown in greater detail in Figure 5. This strapping ring 46 is provided with a plurality of deformations or extensions 48 normal to the plane of the ring which are positioned so that they contact alternate slats as shown in Figure 4. Two such rings are provided, one of which, 47, is of smaller diameter than the outer ring 46 and also being provided with extensions 48' normal to the plane of the strapping ring, these deformations engaging and being electrically connected to the other group of alternate anode slats. Thus during operation the voltage on adjacent anode segments are in phase opposition. As shown in Figure 6, the ring 46 is connected to the slat which is spaced from the ring 47 and likewise the ring 47 is electrically connected at 48' to one of the slats while the other ring 46 is positioned in space with respect thereto.

In the arrangement shown in Figure 7 the slot or recess 49 in the slats 22 is stepped so that the rings are positively positioned with respect to each other, the smaller strapping ring 47 engaging the inner step and the outer ring 46 engaging the outer step, lateral movement between the rings thereby being prevented.

Figure 10:
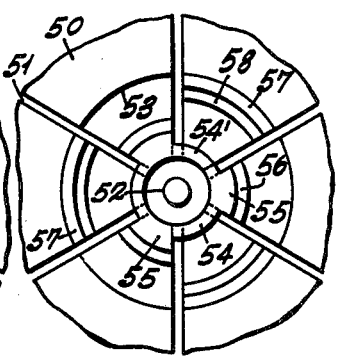
Figure 12:
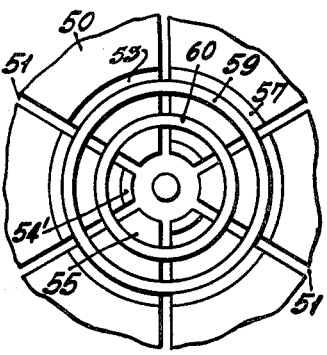
Figure 9:
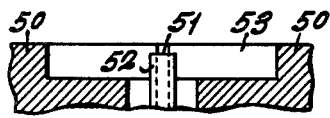
Figure 11:
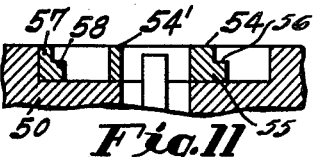
Figure 13:

In the case of magnetrons formed from a block by means of slots extending radially from a central chamber, a different approach to the problem is provided. Referring to Figures 8 to 15, the slots 51 result in the provision of a plurality of anode segments 50, the inner ends of which define the cathode space in which is axially mounted a cathode 52. In the first step in providing the strapping arrangement, the anode segments are recessed as indicated at 53. An element 54 shown in Figures 14 and 15 is then positioned as indicated in Figures 10 and 11. This element or spider 54 is in the form of a ring provided with three projections or legs 55, the outer portions of which legs are formed to provide steps 56. Likewise a ring 57 provided with a step 58 is positioned within the recess 53 in contact with the vertical outer wall of the recess. After being secured in position the ring 57 is cut along the slots 51 and the portions of the ring 57 on alternate segments only are left as indicated in Figure 10, to provide step elements on alternate segments. To provide alternate stepped portions at the inner ends of the anode segments 50, the spider 54 is also cut along said slots so that separate steps 56 are left on alternate segments 50. It is noted that the stepped legs 55 are mounted at the ends of the segments 50 in between those segments in which the step elements of the ring 57 are left. The portions of spider 54 left between the legs 55 after the spider is cut provide the inner walls 54' as shown in Figures 11 and 12. It is now possible to position two concentric strapping rings 59 and 60 within the recess 53, the outer ring 59 being mounted on the step elements of the ring 57 and connecting alternate anode segments and the inner ring 60 being mounted on the stepped legs 55 of the spider 54, the relationship of the inner and outer strapping rings being shown in Figures 12 and 13. Thus a most accurate positioning of the rings results.

Another way of providing the steps 58 is to utilize the laminated construction shown in Figure 20, the first and second laminations 80 adjacent the recess 85 being extended one beyond the other to provide steps on which to place the outer ring 59.

A still further method would be to use a ring having step portions and intermediate portions of less width and then cutting along the slots in the same manner as is done with the central spider.

Another strapping arrangement is shown in Figure 16. Here a pair of spiders are utilized, one of the spiders 74 being provided with radial extensions or legs 75 so that alternate segments 70 between the slots 71 are connected by this spider. The second spider 72 is positioned over the first spider 74 and the radial legs 73 engage the anode segments in between the first mentioned group of segments. The relationship of the two spiders is shown in Figure 17, the concentric ring portions of the spiders being positioned within the recesses 76' in the anode segments 70.

In the modification shown in Figure 18 the inner spider 72' may have its legs 73' deformed or depressed as indicated so that they pass under the ring portions of the outer spider 74.

In Figures 19 and 20 a strapping arrangement according to the present invention is disclosed. The anode block may be made up of a plurality of radially slotted sheet elements or laminations 80 as shown in Figure 20. Two of the sheet elements may be formed to provide recesses for receiving the radial legs 82 of a strapping member 81 which is in the form of a spider and the radial legs 84 of a similar spider 83, other sheet elements being formed to provide a recess 85 for the coaxial ring parts of the spiders 81 and 83 as shown. Figure 19 shows the anode block with the top lamination of Figure 20 removed.

What I claim as new is:

1. An electron discharge device having an anode block comprising a plurality of laminated sheet elements in stacked relationship, said elements having registering central apertures providing a central chamber with radial slots extending therefrom to provide anode segments between said slots, a cathode for supplying electrons within said central chamber, a flat spider element comprising a ring having a plurality of radially directed legs extending therefrom, one of said sheet elements being provided with openings at alternate segments formed to receive the legs of said spider element whereby alternate segments are electrically connected together.

2. An electron discharge device having an anode block comprising a plurality of laminated sheet elements in stacked relationship, said elements having registering apertures providing a central chamber with radial slots projecting therefrom and providing anode segments between the slots, a cathode for supplying electrons within said central chamber, a flat spider element comprising a ring having a plurality of radially directed legs extending therefrom, one of said sheet elements being provided with openings at alternate segments formed to receive the legs of said spider element, whereby alternate segments are electrically connected together, and a second flat spider element spaced from said first flat spider element and received within a second sheet element spaced from said one sheet element and provided with openings at the other alternate segments formed to receive the legs of the spider element, whereby said other alternate segments are electrically connected together.

3. An electron discharge device including an anode block having a central space and a plurality of radially directed slots extending from said space and forming anode segments therebetween, said anode block having a recess adjacent one end of and surrounding said central space, and a pair of coaxial elements of conducting material mounted within said recess, at least one of said elements comprising a ring having radially directed legs extending therefrom and contacting alternate anode segments, and means connecting the other element to the remaining alternate anode segments, said elements being supported out of contact with each other.

BARREMORE B. BROWN.

No references cited.